United States Patent [19]
Wilkinson et al.

[11] 3,920,496
[45] Nov. 18, 1975

[54] CORRUGATED PAPERBOARD AND ITS METHOD OF MANUFACTURE

[76] Inventors: Michael C. Wilkinson, Braemore High St., Shrewton, Wiltshire, England; Leo Blais, 322 Lambert St., Shawinigan, Quebec; Wilhelm N. Martin, 880-14th Ave., Grand'Mere, Quebec; Silvano Tesainer, 413 Scarsdale Crescent, Oakville, Ontario, all of Canada

[22] Filed: Apr. 15, 1974

[21] Appl. No.: 460,981

Related U.S. Application Data

[60] Continuation-in-part of Ser. No. 227,959, Feb. 22, 1972, Pat. No. 3,811,987, which is a division of Ser. No. 819,752, April 28, 1969, abandoned.

[52] U.S. Cl. ................. 156/82; 156/208; 156/210; 428/182; 428/186; 428/485; 428/507; 428/511
[51] Int. Cl.² ... B31F 1/20; B31F 1/22; B29C 25/00
[58] Field of Search ........... 161/133, 135, 137, 235, 161/249, 250; 156/82, 205, 208, 210

[56] References Cited
UNITED STATES PATENTS

| | | | |
|---|---|---|---|
| 1,199,508 | 9/1916 | Swift, Jr. | 161/137 |
| 3,300,350 | 1/1967 | Flynn | 156/82 |
| 3,307,994 | 3/1967 | Scott, Jr. | 156/210 |
| 3,308,006 | 3/1967 | Kresse et al. | 156/210 |
| 3,431,162 | 3/1969 | Morris | 156/210 |
| 3,481,804 | 2/1969 | Snyder | 156/82 |
| 3,518,142 | 6/1970 | Dooley | 156/205 |
| 3,644,159 | 2/1972 | Edkvist | 156/210 |

*Primary Examiner*—George F. Lesmes
*Assistant Examiner*—Paul J. Thibodeau
*Attorney, Agent, or Firm*—Gordon W. Hodson

[57] ABSTRACT

This invention relates to a method of producing corrugated paperboard which is coated with a thermoplastic material which serves to bond the corrugated medium to one or more corrugated facing sheets and the corrugated paperboard produced by this method. The liners and medium which form the corrugated paperboard are sized to inhibit water wicking tendencies. The entire surface area of each surface of the medium is coated with a layer of thermoplastic material and the entire surface area of each liner is coated with a layer of thermoplastic material. The medium is continuously corrugated between a first and second pair of meshing corrugated rollers at a temperature sufficient to mold the medium to the corrugated configuration and retaining the corrugated medium on the second corrugated roll between two points spaced apart by a first annular arc around the periphery of the second roll and bringing the continuously advancing web of the first coated liner into contact with the corrugated medium whereby the coated inner surface of the liner presses against the peaks of the flutes of one of the corrugated coated surfaces of the coated medium. Intense heat is continuously directed against the thermoplastic coating of the inner surface of the first coated liner to render the surface tacky and bondable. The first coated liner is maintained in contact with the peaks of the flutes of the corrugated medium over an arc of rotation of the corrugated roller for a period of time sufficient to permit the thermoplastiic material to harden before the medium with the liner bonded to one side thereof emerges from contact with the second corrugated roller, thereby forming a single-faced corrugated paperboard. The single-faced corrugated paperboard is removed from contact with the second corrugated roller and brought into contact with the continuously advancing web of a second coated liner so that the peaks of the flutes of the remaining unlined corrugated coated surface of the single-faced corrugated paperboard engage the second liner. Heat is again directed to the thermoplastic coating of the inner surface of the second coated liner prior to its contact with the peaks of the flutes of the corrugated medium. The second coated liner is maintained in contact with the peaks of the corrugated medium for a period of time sufficient to permit the thermoplastic material to harden and thereby bond the second liner to the medium to form a water-resistant, warp-free, corrugated paperboard.

3 Claims, 3 Drawing Figures

CORRUGATED PAPERBOARD AND ITS METHOD OF MANUFACTURE

RELATED APPLICATIONS

This application is a continuation-in-part of U.S. application Ser. No. 227,959, filed Feb. 22, 1972, and now U.S. Pat. No. 3,811,987 which is a division of U.S. application Ser. No. 819,752, filed Apr. 28, 1969, and now abandoned.

FIELD OF INVENTION

This invention relates to a method of producing corrugated paperboard which is coated with a thermoplastic material which serves to bond the corrugated medium to one or more facing sheets and the corrugated paperboard produced by the method.

PRIOR ART

Corrugated paperboard is used extensively in the packaging of a great many materials and numerous attempts have been made to increase the strength of the corrugated paperboard by the application of a thermoplastic film to at least one surface of the medium or liner. In addition to increasing the dry strength of paperboard a themoplastic film may be employed to considerably improve the wet strength of paperboard. It has also previously been known to employ a thermoplastic polymeric material to form a bond between a medium and a liner. The actual use of this type of material has been restricted by the high production costs of the known methods and the cost of the thermoplastic film.

Much of the high cost of production results from the slow speed of operation which is required in order to ensure a proper bond between the corrugated medium and the liners. It is important in the known methods of production to carry out the bonding operation at a slow speed in order to provide sufficient time to heat the layer of thermoplastic material to a sufficient extent to ensure that it will form an adhesive layer.

In one known method of producing thermoplastic coated corrugated paperboard, the liner is coated with a layer of thermoplastic material and then brought into contact with the corrugated medium. The liner and the medium are then held in contact with one another and passed over a plurality of heating elements. In this method, heating occurs after the laminate has been formed. Consequently, the laminate must be held firmly together over a substantial portion of its length while the heat is applied. It has been found that with this method interruptions in the adhesion frequently occur due to the difficulties encountered in maintaining the liner and medium in the required intimate relationship for bonding. In addition, in this process the heat must be conducted through the body of the paperboard in order to heat the thermoplastic material and, due to the thermal insulation properties of the paperboard, this process is inefficient and time consuming.

In another known method of forming corrugated paperboard employing thermoplastic films as bonding material, a coated paperboard passes over the heated roller and is heated to a sufficiently high temperature to render the thermoplastic material adhesive. It will be apparent that, with this type of heat conduction, it is important that the paperboard be in contact with the rollers for a period of time which is sufficient to ensure that the thermoplastic material is adquately heated. If the production speed is to be increased, then the temperature of the heated rollers must be increased. A further difficulty with the use of heated rollers lies in the fact that the rollers can not be placed in contact with the thermoplastic film which forms the surface of the coating of the paperboard as the heated rollers would heat the coating to a point where it would become an adhesive and would tend to stick to the surface of the roller.

In view of the fact that in each of the processes discussed in the preceding paragraphs, the heat which is required for heating the thermoplastic material is indirectly applied, it has not been possible to efficiently produce a waterproofed paperboard which has a thermoplastic coating such as polyethylene applied to all of the surfaces of the liner and the medium.

In both of the methods discussed above, a thermoplastic coating is heated by indirect heating means with the result that a considerable amount of time is required to heat the thermoplastic coating to an adhesive state, thus limiting the speed of operation of the processes. In addition, these processes require a lengthy cooling period in order to remove sufficient heat from the laminate to cause the thermoplastic material to set to form a rigid bond between the medium and the liner. Both of these features tend to limit the efficient use of a thermoplastic coating in the production of corrugated paperboard.

SUMMARY OF INVENTION

The present invention overcomes the difficulties of the prior art described above and provides a process for manufacturing a water resistant warp-free heat sealed corrugated paperboard. According to an embodiment of the present invention the first step of the process consists of sizing the liners and the medium to an extent sufficient to inhibit water wicking tendencies of the liners and medium when functioning as water-resistant components in a corrugated paperboard. In the next step the entire surface area of the medium and the entire surface area of the liners is coated with a layer of thermoplastic material. The medium is then corrugated between a first and second meshing corrugated rolls and maintained in the second corrugated roll beyond the point of contact with the first corrugated roll between two points spaced apart on an arc about the periphery of the second roll and placing a continuously advacing web into contact with the corrugated medium so that the coated inner surface of the liner is pressed against the peaks of one of the coated surfaces of the medium. Intense heat, preferrably in the form of an open flame, is directed against the thermoplastic coating of the inner surface of the first liner to render the surface tacky and bondable all the way across the liner before it comes into contact with the corrugated medium so that on contact it will bond with the peaks of the corrugated medium. The liner and medium are maintained in contact over an arc of rotation of the corrugated roll to permit the thermoplastic material to harden before the medium with the liner bonded on one side thereof emerges from contact with the second corrugated roll, thereby forming a single-faced corrugated paperboard.

According to a further embodiment of the present invention a single-faced corrugated paperboard is made as described above and thereafter removed from the second corrugated roller and brought into contact with the second liner which has been sized and coated with thermoplastic material as previously described with respect to the first coated liner. The second coated liner is placed in contact with the peaks of the flutes of the remaining unlined corrugated coated surface of the single-faced corrugated board and intense heat is directed against the thermoplastic coating on the inner surface of the second coated liner to render it tacky and bondable to the peaks of the flutes of the remaining coated surface of the medium. The second liner is maintained in contact with the peaks of the corrugated medium uuntil the thermoplastic material hardens and bonds the second liner to the medium to form a water resistant warp-free corrugated double-faced paperboard.

According to a further embodiment of the present invention there is provided a water resistant warp-free heat sealable corrugated paperboard product consisting of at least two liner board components each having an inner surface and an outer surface and a corrugated component having a pair of oppositely disposed corrugated surfaces wherein all of said surfaces are coated throughout with a layer of thermoplastic material, said liners and medium being sized prior to the application of the thermoplastic material thereto to inhibit the water wicking tendencies of the liners and medium when functioning as water resistant components in said corrugated paperboard, the inner surfaces of the liner board components being bonded to the peaks and flutes of the pair of corrugated surfaces by means of the thermoplastic material.

The invention also provides a method of manufacturing a water-resistant, warp-free, heat-sealable corrugated paperboard consisting of at least two liner members and one corrugated medium wherein both the inner and outer surfaces of the liners and the corrugated medium are coated with a very thin film of thermoplastic material. The method comprises the steps of: sizing the liners and medium during their manufacture to an extent sufficient to inhibit the water wicking tendencies of the liners and medium when functioning as water-resistant components or members in the corrugated paperboard; coating the entire area of the surfaces of the medium and liners with a thin film of thermoplastic material; corrugating the medium; continuously applying heat directly to the thermoplastic coated surface of at least one of the members by the direct application of an open flame to render the heated surface bondable with the juxtaposed surface of the other member and pressing the heated surface into contact with the other juxtaposed surface to form a composite corrugated paperboard laminate.

The invention will be more clearly understood after reference to the following detailed specification read in conjunction with the drawings, wherein.

Suitable thermoplastic materials such as polyethylene polyvinylalcohol, polyvinyl acetate, cellulose acetate, nylon, Teflon (trade mark) or polypropylene may form the surface coating to be bonded by the method of the present invention.

According to a preferred embodiment of this invention, the paperboard which is to be used for the liners and the medium of the corrugated paperboard is firstly sized to inhibit water wicking and therafter laminated to or coated with a film of thermoplastic material such as polyethylene or a hot melt blend of paraffin and/or microcrystalline waxes with copolymers of ethylene vinyl acetate or ethylene ethyl acrylate or ethylene isobutyl acrylate along with synthetic hydrocarbon or terpene resins, butyl rubber, polyisobutylene and synthetic waxes. The film of polyethylene or hot melt may be applied in the continuous process of the apparatus described hereinafter or it may be applied to the surface of the paperboard before it passes to the corrugating apparatus of the present invention.

Figure 1:
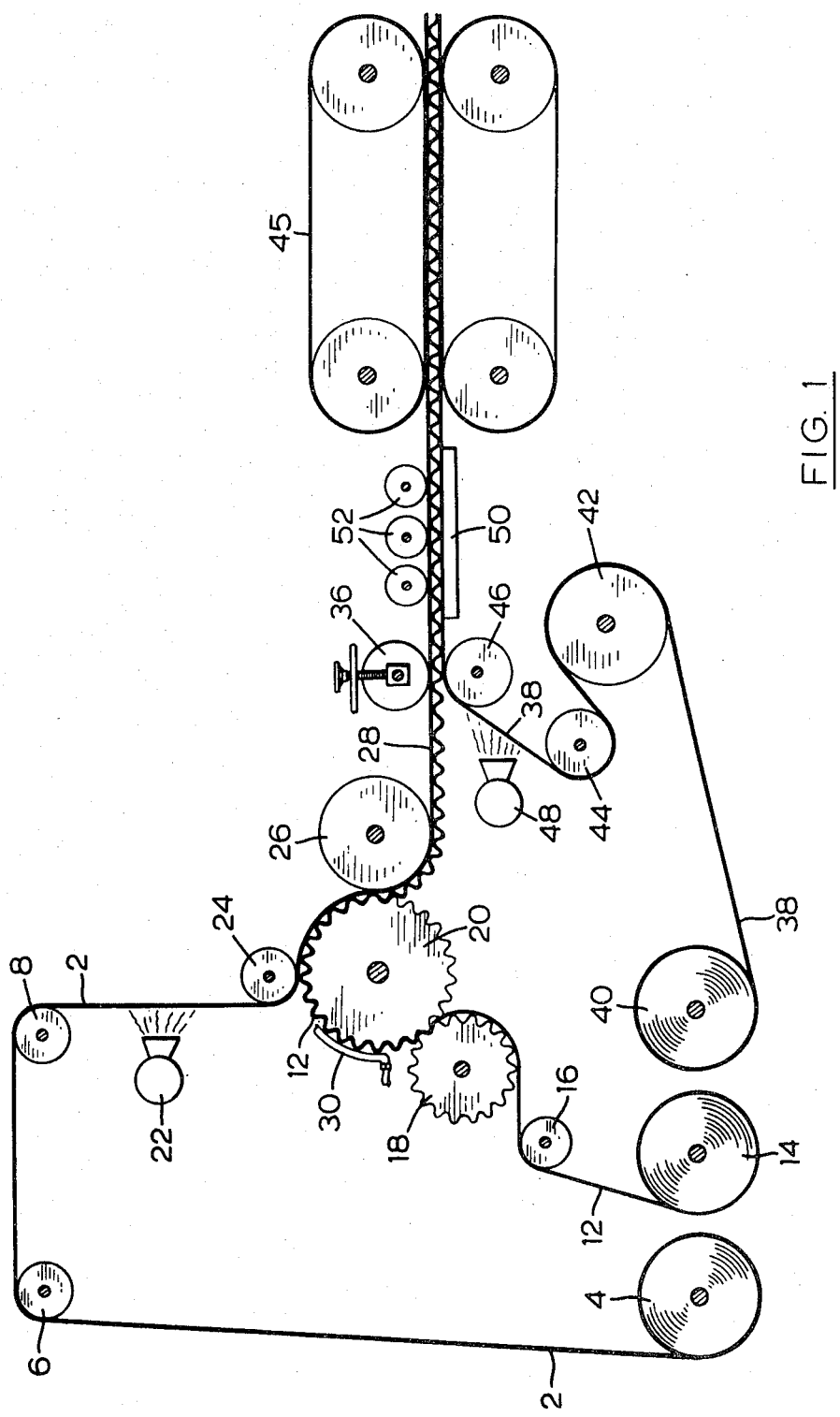
FIG. 1 is a diagrammatic illustration of an apparatus for producing corrguated paperboard according to an embodiment of the present invention.

Referring now to FIG. 1 of the drawings, a liner 2 which, as previously described, is sized and coated with a film of thermoplastic material or hot melt of thermoplastic material is passed from an uncoiling drum 4 over guide rollers 6 and 8. The guide roller 6 is preferably in the form of a jockey roller adapted to take up any slack in the unwinding liner and to provide a uniform tension in the liner. The corrugated medium 12 is unwound from an uncoiling drum 14 and passed over an idler roller 16 and the between the corrugator rollers 18 and 20. The corrugator rollers 18 and 20 are preferably preheated by the circulation of steam or by the location of other suitable heating means within each roller. However, once heated and depending on the speed of operation it was found that the heat transmitted by conduction and the like from the other rollers and from the open flamed burner was sufficient to maintain the corrugator rollers at a temperature sufficient for the medium to mold fairly readily into the desired corrugated shape, without the necessity of having to continue supplying heat to these rollers. In fact, it has been found convenient to use a circulating system of water in these rollers such that the water is heated externally in order to preheat the system and once the burner is operating, heat is extracted from the system (i.e. the water is cooled externally) in order to maintain the rollers at the proper temperature (i.e. in the range of 100° – 200°F.). Where such indirect heat is insufficient, particular means should be provided for maintaining the rollers at the desired temperature. Referring again to liner 2, it will be seen that, after passing over the roller 8, an open flamed burner 22 directs a flame against the coated surface of the liner prior to the point where the liner 2 and the corrugated medium are brought into contact with one another between the corrugator roller 20 and the adjustable gap roller 24. The gap roller 24 is preferably hollow and heated by the circulation of steam or hot air or the like; it can, for example, be tied in with the system which maintains rollers 18 and 20 at the proper temperature. The burner 22 may be a propane air or acetylene oxygen burner or other similar fuel burner which provides a flame which may be directed against the thermoplastic coated surface of the liner 2. In the apparatus illustrated in the drawings, the flame is applied at a point sufficiently close to the roller nip to ensure that the thermoplastic material will be sufficiently hot at the nip for bonding while the flame is preferably spaced at sufficient distance from the nip to ensure that the rollers 20 and 24 will not become overheated and the flame will not blow back by being constricted in the nip area of the rollers. However, depending on the nature of the thermoplastic surface, the size of the flame required, the design of the flame nozzle, etc., the flame can, in certain circumstances, be directed with advantage directly into the nip of rollers 20 and 24. Preferably, the reducing part of the flame is directed against the coated surface as it has been found that the bond strength is increased substantially by using the reducing part of the flame in the heating of the thermoplastic coating. It has been found that the oxidation of the surface coating tends to reduce the surface strength of the bond formed by laminating the thermoplastic liner and medium. However, in some applications it is a practical advantage to sacrifice a certain amount of bond strength to take advantage of the oxidizing part of the flame which, being the hottest part of the flame, will allow the speed of operation to be increased. The heated rollers 18, 20 and 24 heat the liner and the medium 12 to a temperature which is lower than the actual melting point of the thermoplastic coating while the open flame provided by the burner 22 serves to render the surface of the thermoplastic coating bondable prior to entering the nip between the guide roller 24 and the corrugated roller 20.

While the direct application of intense heat to the surface to be bonded may be achieved by the use of heating means other than the direct flame described above it has been found that the direct flame application offers may additional advantages not provided by other heating means. For example, the time required to heat the surfaces by means of a presently available radiant heater element is too great to permit the laminating operation to run at the required high speeds. The cost of operating the type of radiant heater that is presently available is generally substantially greater than the cost of operating an open flame burner. If hot air is used to achieve the melting of the thermoplastic material, the oxidization of the surface will again occur while, if an inert gas is used, the cost of producing and heating the inert gas adds considerably to the production costs. While initially it may appear that it would be desirable to avoid using an open flame in the forming of a laminate of thermoplastic material, particularly where paperboard is a composite part of the laminate, we have found that the advantages derived from the use of an open flame are substantial in reducing the cost of production and providing a laminate which has a very good bond strength.

The heat supplied by the burner is sufficient to render the heated thermoplastic surface of the liner 2 bondable with the thermoplastic surface of the medium when they are pressed into contact with one another between the adjustable gap roller 24 and the roller 20. After leaving the corrugating roller 20, the laminate formed by the corrugated medium 12 and the liner 2 passes over a cooling roller 26 which effects a rapid cooling of the bond between the liner and the medium. The cooling roller 26 may be cooled by the circulation of cooling water or the like therethrough. The corrugated medium 12 is held in contact with the corrugator roller by means of a plurality of fingers 30 which are also cooled to avoid overheating as a result of the proximity to the heating flame and heated corrugator roller. The system for cooling these fingers can, for example, be tied in with that used to maintain rollers 18, 20 and 24 at the desired temperature. It will be noted that the liner 2 extends over an arc of at least 90° of the corrugator roller and tension is applied to this portion of the liner 2 by the gap roller 24 and cooling roller 26 operating in conjunction with belt conveyor 45 such that the liner 2 is pressed firmly against the crests of the corrugated medium. This differs from the conventional practice when the bonding is carried out only between the nip of the rollers with the result that the adhesion tends to be discontinuous because the liner and medium are not held in contact with one another over a sufficiently long period of time. This improved apparatus eliminates the problem known in the industry as the production of "highs and lows". The problem has been that there is a tendency in the industry to form corrugated paperboard wherein the height of the corrugation is inconsistent. This is overcome by the improvement described above by retaining the liner and medium in contact with the roller 20 until the bond is complete such that no relative movement will occur between the liner and medium. In some instances, it may be desirable to locate additional heating means between the rollers 24 and 26 to heat the liner as it passes through this area to ensure uniform bonding before cooling takes place at roller 26.

The single-faced corrugated paperboard which is the product produced by this first bonding operation may be wound onto a suitable coiler to provide a finished product where single-faced corrugated paperboard is the end product required. Alternatively, the single-faced corrugated paperboard generally identified by the reference numeral 28 passes to the second laminating station which will be described hereinafter to form a double-faced corrugated paperboard. If it is desired to separate the two laminating stations such that should one station not operate the other can do so, the single-faced corrugated board can be fed to an accumulating station or deck (as is done conventionally) and from this deck the board can be fed to the second laminating station; in which case, it will be necessary to provide a conveying system to pull/carry the single-faced paperboard to this deck. This is not shown in FIG. 1, instead the board is shown passing directly to the second station. The single-faced paperboard passes under a further adjustable pressure roller 36 at the entry to the second laminating station. A second liner 38 of the same material as the liner 2 is unwound from an uncoiling drum 40 and fed over a series of preheated rollers 42, 44 and 46 which preheat the liner 38 prior to the forming of the bond. Under certain speeds and circumstances it may not be necessary to preheat these rollers, in fact, once the burner is operating roller 46 will have to be cooled to maintain it at the proper temperature in a manner similar to rollers 12, 18 and 24. A burner 48 which is similar to the burner 22 directs an open flame against the surface of the liner 38 which is to be laminated with the single-faced corrugated paperboard 28 between the rollers 36 and 46. The roller 36 is preferably cooled by the circulation of a cooling liquid in order to prevent reheating of the bond formed between the corrugated medium and the liner in the earlier described operation. This cooling, for example, can be related to that of the roller 46. The double-faced laminate which passes from the rollers 36 and 46 is supported by a table 50 at the exit from the rollers and a series of three free floating rollers 52 bear down upon the upper surface of the liner. The table 50 is again preferably cooled by the circulation of a cooling liquid such that the bond between the medium and the liner 38 will be cooled rapidly after leaving the pressure rollers 36 and 46. The double-faced corrugated paperboard then passes between a double belt conveyor generally indicated by the reference numeral 45. The conveyor 45 pulls the corrugated product through the system of rollers. It is understood, of course, that depending on the particular situation, e.g. linear speed of the paperboard, size of the roller, etc., some of the rollers or drums will be freely rotatable, others slightly braked, to avoid slack tensions and, in certain cases, to avoid undue strain on the paperboard some may be separately driven with their speeds properly synchronized so that proper tensions are maintained, especially in the contact arc area about corrugating roller 20.

Figure 2:
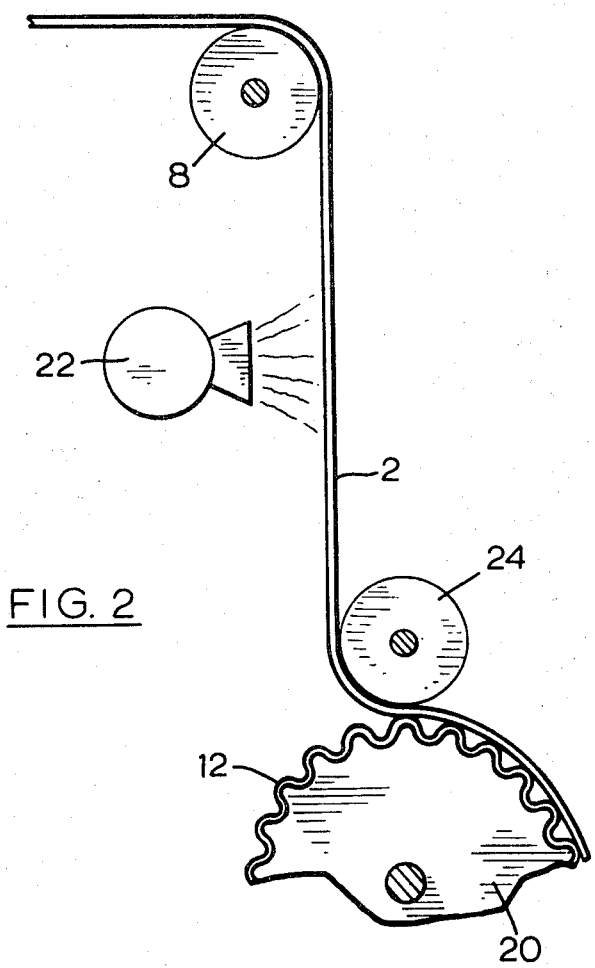
FIG. 2 is an enlarged detail view indicating the manner in which the heat is applied directly to the thermoplastic coating.

In FIG. 2 of the drawings, the manner in which the bond is formed by means of an open flame is illustrated in more detail. FIG. 2 illustrates the bonding of the first liner 2 to the corrugated medium 12. However, it will be understood that in principle, it illustrates a bonding method which is the same as that used to bond the corrugated paperboard 28 to the liner 38. The burner 22 projects a flame directly against the thermoplastic coated surface of the liner 2 to render the surface layer of the thermoplastic material bondable with the corrugated medium 12. The liner 2, corrugated medium 12 and liner 38 pass between the rollers 36 and 46 and are held together over a predetermined period of time, as previously described above.

While the bond may be formed by the direct application of heat from a heat source such as a radiant heater or hot air, we have found that the strength of the bond is improved substantially by the direct application of the reducing portion of an open flame to the thermoplastic coated surface described above. Laminates prepared by the application of the oxidizing portion of a flame has been found to give a poorer interface bond than that formed when the reducing portion of a flame is used. The use of an open flame in the forming of the bond permits the apparatus to run at high speeds because of the higher rate of heat transfer. A suitable flame for the bonding operation may be provided by several known fuel mixtures such as burning propane-air or acetylene-oxygen. Still higher rates of heat transfer as well as more efficient use of the heat produced can be achieved by proper flame-nozzle (burner) design and by using higher velocities for the burning gasses as they pass over the thermoplastic surfaces.

Various tests were carried out on laminate which were coated with polyethylene films and formed by the method of the present invention and by a conventional heated roller method and the following table of results set forth the percentage of original characteristics which were retained.

| Method | Flame Seal | | Heat Seal | |
| --- | --- | --- | --- | --- |
| Tested | Shear | Peel | Shear | Peel |
| Tensile, % Retained | 102–107 | 78–83 | 87–95 | 81–89 |
| Elongation, % Retained | 65–70 | 18–23 | 31–49 | 41–56 |

The strength of a flame seal under shear forces is superior to the strength of a heat sealed laminate. Flame seals also retain the highest percentage of the original elongation indicating almost unchanged bulk properties.

Replacing one of the polyethylene webs by kraft paper and using the same feeding and heating arrangement, good polyethylene paper laminates were obtained. On manual separation of the bond, the bonded area remained covered with a layer of paper fibres. No problems such as burning or creasing of the paper were encountered.

Films sealed were Teflon (trade mark) to Teflon, polyvinyl alcohol to polyvinyl alcohol, polyvinyl acetate to polyvinyl acetate, cellulose acetate to cellulose acetate and Nylon to Nylon. Dissimilar materials such as aluminum foil to polyethylene were also successfully flame sealed indicating that non-thermoplastics may be flame sealed to thermoplastics. This, however, is limited to their mutual compatibility of the wettability of the non-thermoplastic surface by the melted thermoplastic surface.

Excellent bonds of polyethylene to itself and kraft paper were obtained with an acetylene-oxygen flame at speeds of 100 to 200 ft./min. Polyethylene films of 6, 3 and 1 mil thickness can be flame sealed without film burn-through or film distortion. Flame seals of polyethylene are as strong as the original film when tested under shear forces and reach 83 percent of the original film strength under 90° peel forces.

Figure 3:
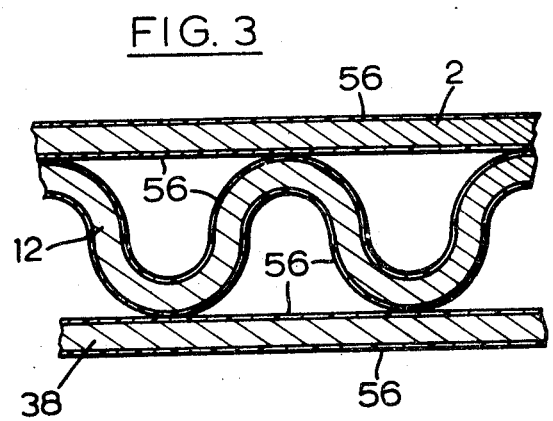
FIG. 3 is a cross-sectional view of a waterproof corrugated paperboard according to an embodiment of this invention.

A product according to an embodiment of the present invention is illustrated in FIG. 3. The product is a double-faced corrugated paperboard consisting of a liner 2, medium 12 and a liner 38. Each surface of the liner 2, medium 12 and liner 38 is covered with a coating or film or thermoplastic material 56 and the liners are bonded to the medium by the bond formed by heat sealing the two abutting layers of thermoplastic material. While it has previously been known to produce a corrugated paperboard wherein the liner and the medium are bonded to one another by means of a layer of thermoplastic material, it has not previously been possible to produce corrugated paperboard in which all of the surfaces were covered with thermoplastic material. Failure to produce such a material has resulted from the fact that, by previous methods, the bonding was achieved by the use of heated rollers which did not apply heat directly to the surface which was to be bonded but rather transmitted heat to a surface which was remote from the bonding surface and relied upon conduction through the paperboard to convey heat to the bonding surfaces. While in the present invention the heated rollers may be used to preheat the liners and the medium, these rollers do not at any time heat the thermoplastic coated surfaces to a temperature above the melting point of the thermoplastic material and consequently there is no tendency for the thermoplastic material to adhere to the rollers. It is therefore, by means of the present invention that the applicant is able to produce a corrugated paperboard which has a thermoplastic covering or coating on each surface thereof. The thermoplastic coating on each surface of the corrugated paperboard provides a corrugated paperboard which has a very greatly improved wet strength over that previously described and in increased flexibility to such an extent that it may conveniently be used in the folding box board industry.

This invention also provides a substantial saving in thermoplastic material as films of 1 mil or less in thickness can be used to cover these paperboard products. With previous methods, the overheating of the materials resulted in the thermoplastic films melting and penetrating into the porous structure of the paper product with the resultant destruction of the film as a barrier to certain materials. Except for high web speeds, it may be found desirable not to preheat the coated paperboard or at least do so very carefully, whenever very thin films of thermoplastic material are being used. Also, as one uses finer film thickness, the prevalence of pin-holes or damaged areas in the surface of the film increases and this in turn decreases the waterproofness or wet strength of the paper product. To offset this situation, it has been found that prior to covering the surface with a thermoplastic material, the paper material should be properly sized in a manner conventionally understood in the pulp and paper trade.

Part of the question of discovery of the novel method of offsetting the wicking action of water from the pin-holes, damaged areas, or edges of the paper material, by sizing the paper material prior to covering it with thermoplastic material arises from the fact that in the usual manufacture of the liners, it is not customary to size these particular paper webs as this would interfere with the conventional starch adhesive procedures. However, whenever liners are sized (internally) the degree of sizing is kept to a low level (less 0.5%) in an effort to keep a balance between a water-resistant top surface and a not too water-resistant inner surface (that which contacts the starch adhesive). On the other hand, conventionally the medium is never sized. Thus, it was only by constant experimentation and design that this discovery was made. And, it was particularly fortunate it was found that the inexpensive sizing techniques customarily used for sizing other types of paper webs, could be used to good advantage in the present invention.

For example, it is customary to internally size paper and paperboard webs with rosin size together with the addition of alum (to precipitate the size). Depending on type of product desired and the type of pulp used, etc., the amount of size used could vary between 0.0 – 3.0%; the amount of alum used will depend largely on the pH of the stock before and after the addition of the alum. Similarly, in the present invention, depending on thickness of the paper web, the thickness of the thermoplastic film, the extent of pin-holing or the chance for surface damage, the degree of sizing of the liners and medium will also lie in this same range. In general, however, the internal addition of rosin size should be greater than 0.5%. Of course, where economically feasible synthetic and other natural sizes and sizing compounds can also be used. Those commonly used in the pulp and paper industry include: various wax sizes; Mersize (a synthetic rosin); various starches; sodium silicate (which in combination with other sizes can improve the rigidity of the paper material); and others. While surface sizing of the liners and medium is also possible, this is not generally a convenient method as the liner and medium paperboard machines are usually not equipped for applying a sizing treatment to the surface of the webs.

In the above, mention has been made of the use of the present invention for materials, such as paperboard, to the surfaces of which specific thermoplastic films have been laminated or whose surfaces have been coated with thermoplastic materials such as paraffin wax, or blends of paraffin wax and microcrystalline waxes or blends of these waxes with one or more plastic materials such as polyolefins, etc., (which latter blends of materials are commonly known as hot melts). Since these two groups of thermoplastic materials, plastic films on the one hand and wax blends on the other, generally fall into separate distinct groups with the plastic films being the more difficult groups to bond either to themselves or to a non-thermoplastic material, it will be noted that this invention now makes possible the bonding together of these more difficult thermoplastic materials. Also, since these films provide tougher, less friable, and higher moisture and temperature resistance properties to the surfaces so covered by these films, and tend to remain on the surface where they are required (rather than penetrate the surface), this invention provides for the production at minimum cost of products having such properties.

Following the production of substantial quantities of the double-faced corrugated board of this invention on a commercial scale prototype machine made according to the present invention, it was found that the board so formed was substantially free from warp. This is a substantial improvement over conventional corrugated board which is often plagued by warping problems which decrease machine productivity. Warping problems arise mainly out of uneven moisture distribution in the board and the conventional starch (water) adhesive system greatly aggravates this situation. This is avoided in the present invention as the polyethylene-flame adhesive system does not involve water as the polyethylene-flame adhesive system does nnot involve water or moisture.

In fact, if anything it is possible under certain conditions for the board particularly the medium to become too dry with a tendency to crack. This is possibly due to the drying conditions experienced during the polyethylene coating operation. This situation can be overcome by a number of methods, for example, (a) by adding additional moisture to the board just prior to the coating operation; (b) by varying the pulp furnish for the medium e.g. the use of kraft pulp in place of the conventional neutral sulphite semi-chemical pulp (NSSC) will decrease the cracking tendency, thus, while a 100% kraft furnish tended to give a soft board, one of 60% kraft and 40% NSSC was found to be a satisfactory compromise.

The corrugated board of the present invention is finding great use in making containers for "rigid-when-wet" applications. Such applications include the packing of poultry and other foodstuffs with ice or the hydro-cooling of these foodstuffs prior to shipment (in this situation the container and the foodstuff is immersed in water at near the freezing temperature until the container and the food have been cooled then the water is drained off).

It has also been found that the corrugated board of the present invention has heat sealable properties which are of particular use in the manufacture of containers and the like. For example, the surfaces of flaps of conventional corrugated containers are usually secured to the surface of the container or to that of other flaps by conventional stitching or stapling methods, use of the board of the present invention, however, makes it possible to secure these surfaces (and flaps) by merely applying heat to the two contacting surfaces and pressing these surfaces together thereby bonding them. This heat is applied most conveniently by simply passing a direct flame (e.g. propane-air) fairly rapidly over these surfaces and then quickly pressing them together. Containers made by this heat sealing method have been found to be structurally stronger than those made using conventional stitching or stapling methods.

What we claim as our invention is:

1. In the process of manufacturing a water-resistant, warp-free, heat sealable corrugated paperboard consisting of at least two liners each having an inner surface and an outer surface and a medium having a pair of oppositely disposed surfaces, the steps of:
- a. sizing the surfaces of said liners and medium to an extent sufficient to inhibit the water wicking tendencies of said liners and medium when functioning as water-resistant components in said corrugated paperboard;
- b. coating the entire area of each of said surfaces of said medium with a layer of thermoplastic material to form a coated medium having a pair of oppositely disposed coated surfaces;
- c. coating the entire area of said inner and outer surface of each of said liners with a layer of thermoplastic material to form a first and second coated liner each having a coated inner surface and a coated outer surfac;
- d. continuously corrugating said coated medium between a first and second meshing corrugated roll to form a pair of oppositely disposed corrugated coated surfaces and during said corrugating maintaining said coated medium
  - i. at a temperature sufficient for said coated medium to mold into the desired corrugated shape but below the melting point of the thermoplastic material,
  - ii. meshed in the second corrugated roll beyond said first corrugated roll and between two points spaced apart by a first annular arc around the periphery of the second roll;
- e. bringing a continuously advancing web of said first coated liner into contact with said corrugated medium wherein said coated inner surface presses against the peaks of the flutes of one of said corrugated coated surfaces of the coated medium meshed in said second corrugated roll in a second arc around the periphery of the second corrugated roll which arc forms a part of the said first arc between said spaced points;
- f. continuously directing intense heat directly against the thermoplastic coating of said inner surface of said first coated liner near the beginning of the second arc, said heat being sufficient to melt said coating to render said surface tacky and bondable all the way across the liner before it comes into contact with said corrugated medium so that on contact it will bond to the peaks of said flutes;
- g. maintaining said first coated liner in contact with the peaks of said flutes over said second arc and cooling said first coated liner to cool said first heated surface for a period of time sufficient to permit the thermoplastic material to harden before the medium with the liner bonded to one side of it emerges from contact with said second corrugated roll, thereby forming a single-faced corrugated board;
- h. removing said single-faced corrugated board away from contact with said second corrugated roll and bringing a continuously advancing web of said second coated liner into contact at its inner surface with the peaks of the flutes of the remaining corrugated coated surface of said single-faced corrugated board;
- i. continuously directing intense heat directly against the thermoplastic coating of said inner surface of said second coated liner to render it tacky and bondable to the peaks of said flutes of said remaining coated surface; and
- j. maintaining said second coated liner in contact with said peaks and cooling said second coated liner to cool said remaining coated surface for a period of time sufficient to permit the thermoplastic material to harden thereby bonding said second liner to said medium to form said water-resistant, warp-free, corrugated paperboard.

2. The method of claim 1 wherein said intense heat is supplied by directing a flame against said coating.

3. The method of claim 1 wherein the thickness of said layer of thermoplastic material is less than 1 mil and the said sizing comprise an internal treatment involving more than 0.5% rosin.

* * * * *